(12) United States Patent
Kane et al.

(10) Patent No.: US 6,292,249 B1
(45) Date of Patent: Sep. 18, 2001

(54) UNIFORM CELL-GAP SPACING IN LCD

(75) Inventors: Robert H. Kane, Ho-Ho-Kus, NJ (US); George A. Melnik, Montrose, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/107,850

(22) Filed: Jun. 30, 1998

(51) Int. Cl.[7] .................. G02F 1/1339; G02F 1/1333
(52) U.S. Cl. ................. 349/155; 349/153; 349/122
(58) Field of Search ................. 349/155, 156, 349/153, 122

(56) References Cited

U.S. PATENT DOCUMENTS

| | | | |
|---|---|---|---|
| 4,844,597 | * 7/1989 | Katagiri et al. | 349/156 |
| 5,537,235 | * 7/1996 | Ishihara et al. | 349/155 |
| 5,677,749 | 10/1997 | Tsubota et al. | 349/160 |
| 5,691,793 | 11/1997 | Watanabe et al. | 349/155 |
| 5,739,888 | * 4/1998 | Ogura et al. | 349/153 |
| 5,838,414 | * 11/1998 | Lee | 349/156 |
| 5,952,676 | * 9/1999 | Sato et al. | 349/156 |

FOREIGN PATENT DOCUMENTS

| | | |
|---|---|---|
| 0621502A1 | 10/1994 | (EP) . |
| 1177018A | 7/1989 | (JP) . |
| 234820A | 2/1990 | (JP) . |
| 273229A | 3/1990 | (JP) . |
| 380224A | 4/1991 | (JP) . |
| 5107545A | 4/1993 | (JP) . |
| 5158052A | 6/1993 | (JP) . |
| 6208119A | 7/1994 | (JP) . |
| 1068955 | 8/1996 | (JP) . |

OTHER PUBLICATIONS

Abstract JP 10068955.
Res Discl 34006 592 Aug. 1992 "Uniform cell gap in LCD"
Kaufman et al., J. Electrochem. Soc., vol. 138, No. 11 p. 3460 (1991).

* cited by examiner

*Primary Examiner*—Toan Ton

(57) ABSTRACT

A liquid crystal display apparatus includes a first substrate supporting an array of pixel electrodes, defining a display area, and spacer elements having planarized surfaces defining a plane that is parallel to the pixel electrodes and spaced by a distance corresponding to a desired liquid crystal cell gap. Spacers outside of the display area precisely space a covering substrate carrying a transparent counter electrode at the desired cell gap.

12 Claims, 3 Drawing Sheets

UNIFORM CELL-GAP SPACING IN LCD

BACKGROUND OF THE INVENTION

1. Field of the Invention

The invention relates to liquid crystal display (LCD) apparatus and, in particular, to achieving uniform liquid-crystal cell gaps in such apparatus.

2. Description of Related Art

LCD apparatus typically include an active substrate on which an array of circuit elements (e.g. semiconductor devices, pixel electrodes, and row and column conductors) are deposited to define a display area, a window substrate including an optically-transparent portion disposed opposite the display area, and a seal surrounding the display area and compressed between the two substrates for containing the liquid crystal material. Typically, the active substrate also includes circuit elements positioned outside of the seal which are electrically connected to circuit elements in the display area via conductors passing through the seal.

Such an apparatus is described, for example, in U.S. Pat. No. 5,691,793, which is hereby incorporated by reference. As is stated in that patent, in fabricating an LCD apparatus it is important that the gap between the opposing substrates be as uniform as possible. In particular, the gaps between opposing electrodes on the two substrates, which define the liquid crystal cells for the different pixels, must be uniform. Variations in these gaps will adversely affect the quality of the image displayed. In order to make the gaps between the substrates uniform, the '793 patent proposes that gap-adjusting layers be deposited on shorter circuit elements to build them up to the same height as taller circuit elements.

The degree to which that approach achieves gap uniformity depends on the amount of tolerance buildup. In other words, the tolerance at each of the built-up circuit elements is the sum of the tolerances for the element itself and for the gap-adjusting layer. For any built-up element which itself includes multiple layers, the tolerance buildup can cause a gap error that is higher than tolerable for meeting the ever-increasing demands for LCDs with improved image quality.

Another known approach to achieving gap uniformity is that of scattering spacer elements having predetermined dimensions on one substrate before attaching the other substrate. This technique presents a variety of problems including:

the difficulty of evenly distributing the spacer elements on the substrate;

the impracticality of selectively distributing spacer elements on active substrates supporting circuit elements with varying heights;

the possibility that the spacer elements will land on display pixels and obstruct impinging image-forming light radiation.

SUMMARY OF THE INVENTION

It is an object of the invention to provide a LCD apparatus having a high degree of gap uniformity in the display area.

In accordance with the invention a liquid crystal display apparatus is provided which includes:

a first substrate having a supporting side on which are supported an array of pixel electrodes defining a display area;

a second substrate having a covering side opposing the supporting side of the first substrate, the covering side bearing at least one counter electrode disposed opposite the pixel electrodes;

a plurality of first spacer elements affixed to the first substrate at distributed locations within the display area, the first spacer elements having respective planarized surfaces at a uniform distance from the pixel electrodes;

a plurality of second spacer elements positioned at distributed locations outside of the display area, each of the second spacer elements being affixed to one of the first and second substrates and having heights sized to support the second substrate relative to the first substrate such that the at least one counter electrode is parallel to the planarized surfaces of the first spacer elements, thereby establishing uniform cell gaps between the pixel electrodes and the at least one counter electrode;

an adhesive for securing the first and second substrates together to maintain the second spacer elements in contact with first and second substrates.

Figure 1A:
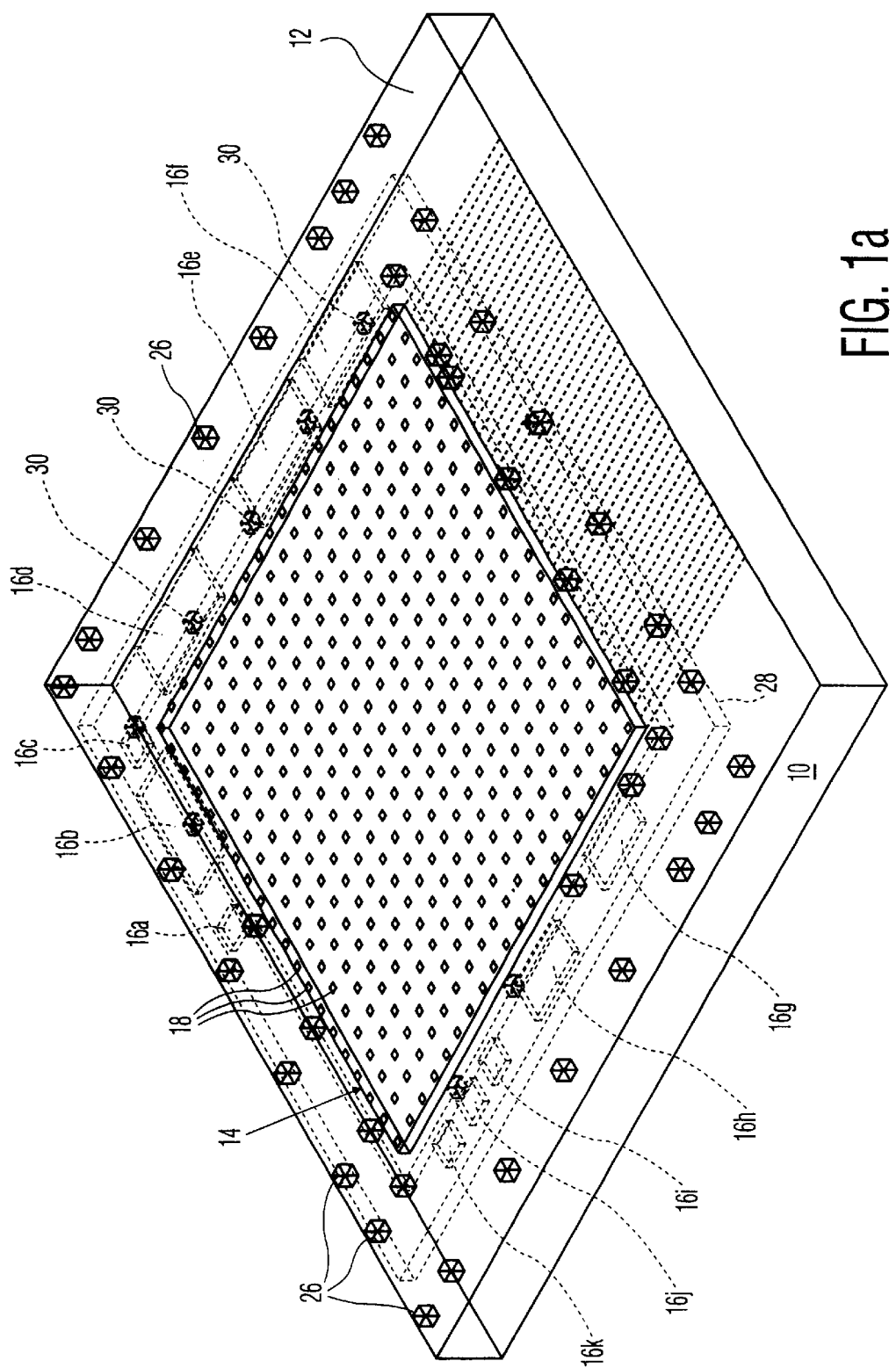
FIGS. 1a and 1b are three-dimensional views of an embodiment of an LCD apparatus in accordance with the invention.

None of the drawing views are to scale.

DESCRIPTION OF THE PREFERRED EMBODIMENTS

FIG. 1a illustrates a partially-constructed LCD apparatus including an insulating substrate 10 having a side with a planarized surface 12 supporting a plurality of circuit arrangements including LCD device 14 and a number of auxiliary circuit arrangements 16a–16k. Conventionally, the substrate 10 is a silicon wafer chip or light-transmissive glass on which the surface 12 has been planarized by a polishing technique, such as that described in Kaufman et al., J. Electrochem. Soc., Vol. 138, No. 11, pages 3460–3464 (1991), which is hereby incorporated by reference.

To simplify the drawing, the LCD device 14 is not shown in detail to the extent that it includes typical LCD circuit elements such as pixel electrodes, pixel addressing conductors, switching transistor elements etc. It is important to note, however, that each of the pixel electrodes has a surface lying in a common plane that defines a lower boundary of the liquid-crystal cell gaps. As is well known in the art, the pixel electrodes are either reflective or transmissive with respect to the light radiation which they are intended to modulate.

Each of the auxiliary circuit arrangements 16a–16k includes circuitry which is conveniently located close to the LCD device, e.g. row and column electrode selection circuitry and circuitry for converting image signals to a form recognizable by the LCD device. Typically the circuit arrangements 14 and 16a–16k are formed as multi layer integrated circuits and are interconnected by conductive tracks (not shown) disposed on the surface 12.

FIG. 1a also shows a plurality of planarized surfaces 18 lying in a common plane that is higher than any other surface above the plane of the substrate surface 12. These surfaces collectively define an upper boundary plane of the liquid-crystal cell gaps. They are formed by planarizing the tops of spacers that are photo-lithographically formed on the LCD device 14 at distributed locations that do not significantly interfere with light transmission to the pixel electrodes. Each of these spacers is formed of an incompressible material, such as silicon nitride or silicon dioxide. Note that, as used herein, the word "incompressible", with respect to a specific material, means that the material thickness does not change significantly, relative to a desired tolerance for the liquid-crystal cell gap, when the material is subjected to the pressures which it experiences during manufacture.

Figure 1B:
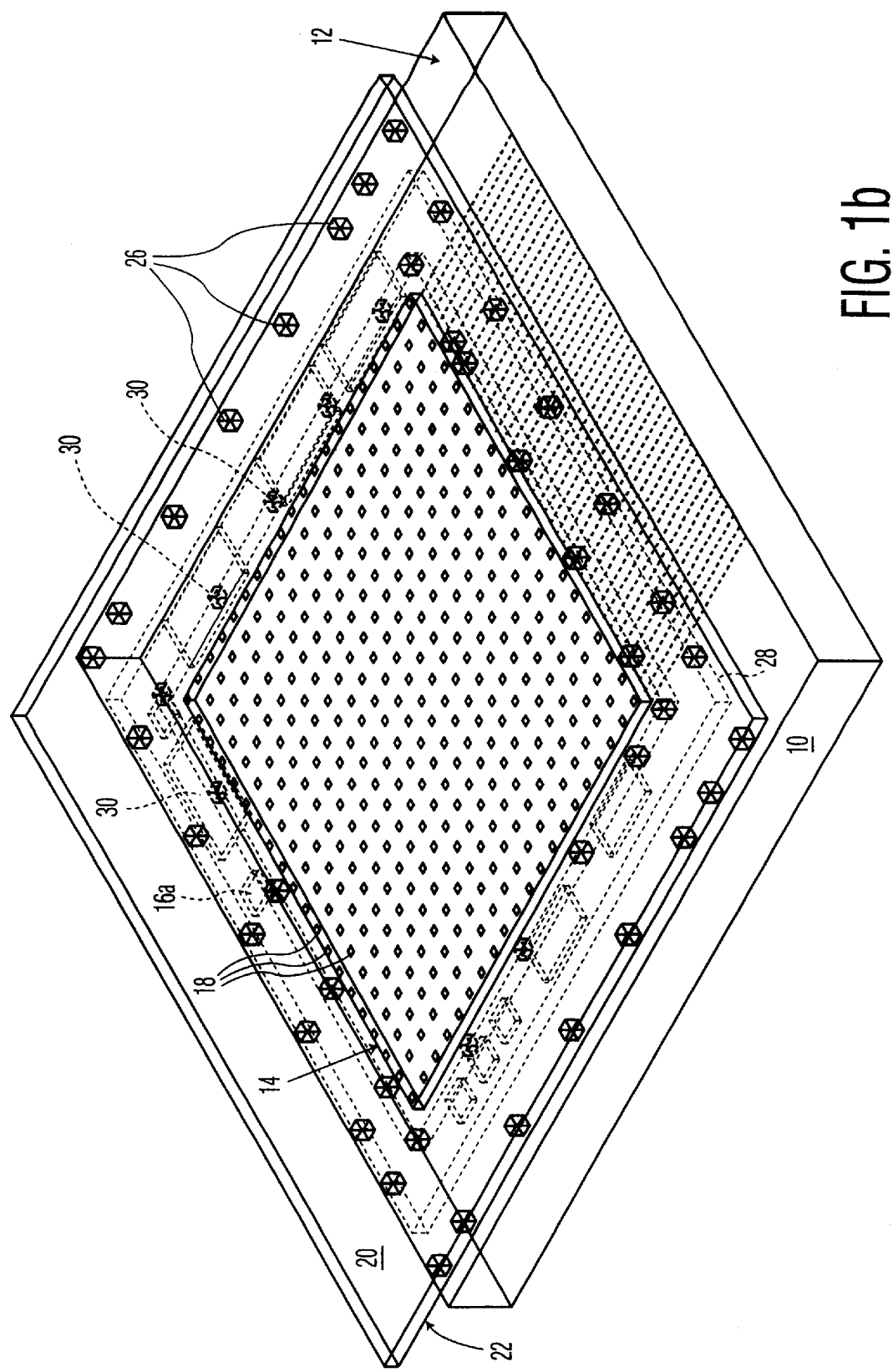

FIG. 1b shows the completed LCD apparatus, after a covering substrate 20 has been attached to the substrate 10. Substrate 20 is formed of a transparent material, e.g. glass having a coefficient of expansion equal to the material of substrate 10, and has a planarized underside 22 (referred to herein as the covering side) which is disposed opposite the planarized surface 12 of the substrate 10. A single counter-pixel electrode (not shown), also commonly referred to as a counter electrode, is disposed on the covering side 22 such that it covers at least the display area in the LCD device 14, i.e. the area occupied by the pixel electrodes. Alternatively, the counter electrode could include a plurality of counter-pixel electrodes, each deposited on the covering side 22 opposite one or more of the pixel electrodes. The counter electrode is formed of a uniform-thickness layer of a conductive material, e.g. indium tin oxide (ITO) which is transparent to the light radiation to be modulated by the LCD. To facilitate electrical connections to the counter electrode, one or more conductive tracks (not shown) may be deposited on the covering side 22 and running, for example, from the counter electrode to an edge of the substrate 20. Alternatively, the counter electrode itself could be made continuous to at least one of the edges of the substrate 20. To provide access to such conductive tracks, or to such a continuous counter electrode, on the underside of the substrate 20, it is shifted relative to the substrate 10 in the embodiment shown in FIG. 1b.

In this embodiment, the substrate 20 is supported on the planarized surfaces 18 and on a plurality of spacers 26 that are positioned at distributed locations outside of the display area. Each of these spacers 26 is positioned at a location where the respective regions of the opposing sides of substrates 10 and 20, that are contacted by the upper and lower surfaces of the spacer, have respective heights which are known to a high degree of accuracy. Preferably, as shown in FIG. 1b, these are regions where the surfaces of the spacers 26 directly contact the planarized surfaces of the opposing substrates. In this case the height of each spacer 26 will be equal to the height above the surface 12 of the plane defined by the planarized surfaces 18. A simple manner of accurately positioning and constructing the spacers 26 is by photo-lithographically forming each spacer in a layer deposited to the required height on one of the surfaces 12 or 22. Because of the evenness of these planarized surfaces, the spacers may be formed of an incompressible material, e.g. silicon nitride or silicon dioxide. If a degree of precision greater than that achievable by merely controlling the height of deposition is desired, all of the spacers 26 can be deposited to a larger-than-desired height and themselves planarized. If all of the spacers 26 are deposited on the surface 12, the upper surfaces of these spacers can be planarized simultaneously with the planarization of the surfaces 18.

FIGS. 1a and 1b further illustrate the positioning of a layer of adhesive 28 which is sandwiched between the facing sides of the substrates 10 and 20 during assembly. This adhesive is deposited, as is known in the art, on either substrate such that it surrounds the LCD device 14 without covering the display area, allowing for lateral expansion of the adhesive as the substrates are compressed together and held during curing of the adhesive. The adhesive both forms (together with the surfaces 12 and 22) a sealed chamber for containing the liquid-crystal material, and holds the two substrates together. Any adhesive commonly used for this purpose may be employed, provided that it does not expand during curing. Preferably, the adhesive will shrink slightly during curing, to ensure that the spacers 26 remain tightly compressed between the substrates. Some adhesives that are recommended for this purpose are UV-curable or thermoset epoxy adhesives, e.g. those available from the Norland Optical Adhesives and the Ablestick companies, respectively. The adhesive 28 may deposited indiscriminately with respect to the spacers, because it is displaced during assembly when the substrates 10 and 20 are pressed together.

In accordance with this embodiment of the invention, the substrates are compressed together with sufficient force, and contact area of the compressing equipment, to ensure that the unaffixed surfaces of the spacers 26 are in close physical contact with the surfaces that they have been specifically positioned to contact. This can be easily verified by, for example, leaving the critical display area uncovered and using known interferometry techniques to ensure that the light transparent region of substrate 20 is in contact with the planarized surfaces 18.

Figure 2:
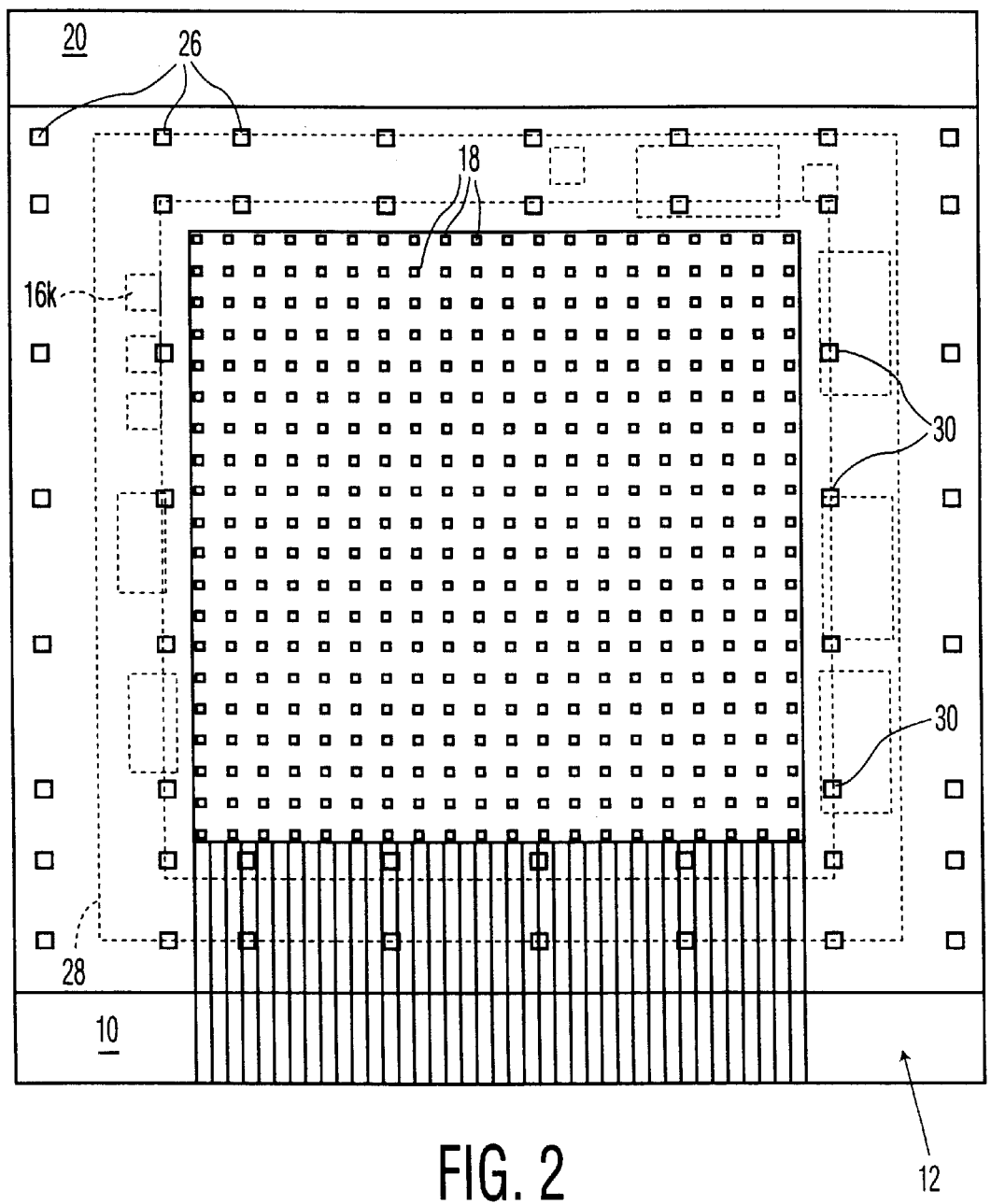
FIG. 2 is a top view of the embodiment of FIGS. 1a and 1b.

FIGS. 1a, 1b and 2 also illustrate a second type of spacer 30 (shown in broken lines), which are dissimilar in type and position from the spacers 26. Specifically, each of spacers 30 is a compressible spacer that is positioned in a location where the heights of the respective regions of the opposing sides of substrates 10 and 20 that are contacted by the upper and lower surfaces of the spacer are not known to a sufficiently high degree of accuracy. This situation occurs, for example, if large areas of the surface 12 are occupied by circuit elements and conductor tracks and an even distribution of spacers cannot be provided without avoiding these occupied areas. The distribution of spacers outside the display area must be sufficiently even to prevent any downward movement of the substrate 20 outside of this area, caused by shrinkage of the adhesive during curing, that would in turn cause upward bowing of the substrate 20 above the display area.

The height of each spacer 30 is at least equal to the maximum distance between the surfaces that the spacer's upper and lower surfaces will contact, when the planarized surfaces 12 and 22 are equidistant, with the lower surface of the counter electrode resting evenly on the planarized surfaces 18. For example, that spacer 30 positioned to have its bottom surface pressed against the top of a respective surface of circuit element 16d and its top surface affixed directly to the surface 22 will have a height at least equal to the required nominal height plus the maximum possible tolerance deviation of the circuit element below its nominal height.

As in the case of the spacers 26, each compressible spacer 30 may be accurately positioned and constructed by photo-lithographically forming spacer material deposited to the required height onto one of the two surfaces that it will contact and space apart. Recommended compressible materials include curable photoresists and photo-imagable polyimides such as those available from Nissan Corporation. As in the case where only incompressible spacers 26 are used, after the deposition of the spacers 26 and 30 and the adhesive, the substrates are compressed together and held, during curing of the adhesive, with the light-transparent region of substrate 20 maintained in contact with the planarized surfaces 18. The compressible material of the spacers 30 is sufficiently non-resilient to maintain the cell-gap spacing in the display area within the required tolerance.

We claim:

1. A liquid crystal display apparatus comprising:
   a. a first substrate including a supporting side on which is supported an array of pixel electrodes defining a display area;
   b. a second substrate having a covering side opposing the supporting side of the first substrate, said covering side bearing at least one counter electrode disposed opposite the pixel electrodes;
   c. a plurality of first spacer elements supported by the first substrate at distributed locations within the display area, said first spacer elements having respective planarized surfaces at a uniform distance from the pixel electrodes;
   d. a plurality of second spacer elements spaced respectively from each other and positioned at distributed locations outside of the display area, each of said second spacer elements being affixed to one of the first and second substrates and having heights sized to support the second substrate relative to the first substrate such that the at least one counter electrode is parallel to the planarized surfaces of the first spacer elements, thereby establishing uniform cell gaps between the pixel electrodes and the at least one counter electrode; and
   e. an adhesive for securing the first and second substrates together to maintain the second spacer elements in contact with the first and second substrates.

2. A liquid crystal display apparatus as in claim 1 where the adhesive forms a seal surrounding the display area for defining a liquid-crystal-containing chamber.

3. A liquid crystal display apparatus as in claim 1 where each of said first spacer elements is a respective incompressible spacer element, and at least one of the second spacer elements affixed to one of the substrates comprises a compressible spacer element of a non-elastic material which has been sized by compressing said element.

4. A liquid crystal display apparatus as in claim 3 where at least a different one of the second spacer elements affixed to one of the substrates comprises an incompressible spacer element of predetermined height and is positioned to contact a surface on the other substrate which has a precisely-determined height above a planar surface of said other substrate.

5. A liquid crystal display apparatus as in claim 4 where said precisely-determined height is zero.

6. A liquid crystal display apparatus as in claim 1 where one of the second spacer elements affixed to one of the substrates is a compressible spacer element of a non-elastic material which has been sized by compressing said element, and at least a different one of the second spacer elements affixed to one of the substrates comprises an incompressible spacer element of predetermined height and is positioned to contact a surface on the other substrate which has a precisely-determined height above a planar surface of said other substrate.

7. A-liquid crystal display apparatus as in claim 6 where said precisely-determined height is zero.

8. A liquid crystal display apparatus as in claim 6 where said first spacer elements have substantially a same height, and said a one of the second spacer elements affixed to one of the substrates has a height different from said same height.

9. A liquid crystal display apparatus as in claim 1 including, on said supporting side of the first substrate, at least one circuit arrangement spaced apart from the display area, at least a first of said second spacer elements being positioned to have a second spacer element surface pressed against a surface of said one circuit arrangement disposed opposite said covering side.

10. A liquid crystal display apparatus as in claim 1 where the distributed locations of the second spacer elements surround the display area.

11. A liquid crystal display apparatus as in claim 1 where the heights of the second spacer elements are sized to support the first substrate such that the at least one counter electrode is in contact with the planarized surfaces of the first spacer elements.

12. A liquid crystal display apparatus as in claim 8 where said different one of the second spacer elements affixed to one of the substrates has a height equal to said same height.

* * * * *